(12) United States Patent
Chen et al.

(10) Patent No.: US 11,009,367 B2
(45) Date of Patent: May 18, 2021

(54) METHOD AND DEVICE FOR DISPLAYING NAVIGATION INFORMATION

(71) Applicant: BAIDU ONLINE NETWORK TECHNOLOGY (BEIJING) CO., LTD., Beijing (CN)

(72) Inventors: Yue Chen, Beijing (CN); Juzhang Zhu, Beijing (CN); Yu Chen, Beijing (CN); Qi Shi, Beijing (CN); Li Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 255 days.

(21) Appl. No.: 16/275,239

(22) Filed: Feb. 13, 2019

(65) Prior Publication Data
US 2019/0178670 A1    Jun. 13, 2019

Related U.S. Application Data

(63) Continuation of application No. PCT/CN2017/074444, filed on Feb. 22, 2017.

(30) Foreign Application Priority Data

Sep. 30, 2016    (CN) .......................... 201610875599.2

(51) Int. Cl.
*G01C 21/00*        (2006.01)
*G01C 21/36*        (2006.01)

(52) U.S. Cl.
CPC ....... *G01C 21/367* (2013.01); *G01C 21/3626* (2013.01); *G01C 21/3629* (2013.01)

(58) Field of Classification Search
CPC .............. G01C 21/367; G01C 21/3626; G01C 21/3629; G01C 21/3644; G01C 21/3446; G01C 21/3461
See application file for complete search history.

(56) References Cited

U.S. PATENT DOCUMENTS 6,078,865 A    6/2000   Koyanagi
8,543,293 B2   9/2013   Tanizaki
(Continued)

FOREIGN PATENT DOCUMENTS

CN    102192753 A    9/2011
CN    104280045 A    1/2015
(Continued)

OTHER PUBLICATIONS

PCT/CN2017/074444 English translation of International Search Report dated Jun. 7, 2017, 2 pages.
(Continued)

*Primary Examiner* — Ian Jen
(74) *Attorney, Agent, or Firm* — Lathrop GPM LLP

(57) ABSTRACT

Embodiments of the present disclosure provide a method and device for displaying navigation information. The method includes the followings. A current position and a position of an intersection for changing direction are acquired. Road features between the current position and the position of the intersection for changing direction are analyzed to determine a ground object of the intersection for changing direction. The ground object of the intersection for changing direction is displayed. Embodiments of the present disclosure further provide a locating device.

14 Claims, 3 Drawing Sheets acquiring a current position and a position of an intersection for changing direction — S11 analyzing road features between the current position and the position of the intersection for changing direction, to determine a ground object of the intersection for changing direction — S12 displaying the ground object of the intersection for changing direction — S13

(56) References Cited

U.S. PATENT DOCUMENTS

2011/0184639 A1   7/2011  Holsinger
2013/0197798 A1*  8/2013  Clark ................. G01C 21/3655
                                                          701/428

FOREIGN PATENT DOCUMENTS

| EP | 0837434 A1 | 4/1998 |
| EP | 1912043 A1 | 4/2008 |
| EP | 1975568 A2 | 10/2008 |
| JP | H0927961 A | 11/1997 |
| JP | H10227652 A | 8/1998 |
| JP | 2007240193 A | 9/2007 |
| JP | 2009270900 A | 11/2009 |
| JP | 2013096713 A | 5/2013 |
| JP | 2014174078 A | 9/2014 |
| WO | WO 2014195406 A1 | 12/2014 |

OTHER PUBLICATIONS

Korean Patent Application No. 10-2019-7004162 Office Action dated Feb. 18, 2020, 8 pages.
Korean Patent Application No. 10-2019-7004162 English translation of Office Action dated Feb. 18, 2020, 6 pages.
Japanese Patent Application No. 2019-501545 Office Action dated Feb. 18, 2020, 3 pages.
Japanese Patent Application No. 2019-501545 English translation of Office Action dated Feb. 18, 2020, 3 pages.
Singapore Patent Application No. 11201901150U Search Report and Written Opinion dated Mar. 31, 2020, 7 pages.
European Patent Application No. 17854351.8 extended Search and Opinion dated Aug. 13, 2020, 9 pages.

* cited by examiner

METHOD AND DEVICE FOR DISPLAYING NAVIGATION INFORMATION

CROSS REFERENCE TO RELATED APPLICATION

This application is a continuation application of International Application No. PCT/CN2017/074,444, which claims priority to Chinese Patent Application No. 201610875599.2, filed on Sep. 30, 2016, the entire contents of which are incorporated herein by reference.

TECHNICAL FIELD

The present disclosure relates to the field of navigation technologies, and more particular to a method and a device for displaying navigation information.

BACKGROUND

A function of simply displaying navigation information on a panel is a basic displaying function, which is an important way for a driver to obtain driving information in addition to voice broadcast during driving. In a situation where the driver cannot hear the navigation voice broadcast clearly, the information on the panel allows the driver to obtain information of a next intersection for changing direction, such that the driver may prepare for the next turn, such as changing lanes in advance.

SUMMARY

Embodiments of the present disclosure provide a method for displaying navigation information, a locating device and a non-transitory computer readable storage medium.

The method for displaying navigation information according to a first aspect of embodiments of the present disclosure includes: acquiring a current position and a position of an intersection for changing direction; analyzing road features between the current position and the position of the intersection for changing direction, to determine a ground object of the intersection for changing direction; and displaying the ground object of the intersection for changing direction.

The locating device includes a processor, and a memory, configured to store instructions executable by the processor. The processor is configured to acquire a current position and a position of an intersection for changing direction; analyze road features between the current position and the position of the intersection for changing direction, to determine a ground object of the intersection for changing direction; and display the ground object of the intersection for changing direction.

Embodiments of the present disclosure further provide a non-transitory computer readable storage medium. When instructions in the storage medium are executed by a processor of a terminal, the terminal is configured to acquire a current position and a position of an intersection for changing direction; analyze road features between the current position and the position of the intersection for changing direction, to determine a ground object of the intersection for changing direction; and display the ground object of the intersection for changing direction.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the present application will become apparent and readily understood from descriptions of embodiments in combination with following drawings, in which.

DETAILED DESCRIPTION

Figure 1:
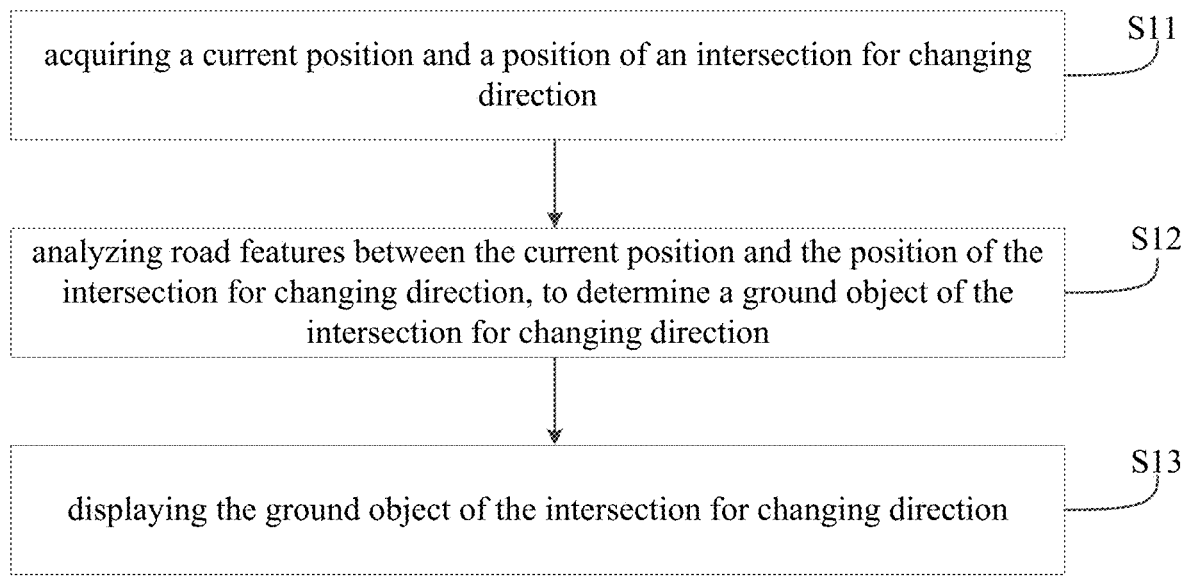
FIG. 1 is a flow chart illustrating a method for displaying navigation information provided in an embodiment of the present disclosure.

Embodiments of the present application are described in detail below, and examples of the embodiments are illustrated in the accompanying drawings, in which the same or similar reference numerals indicate the same or similar modules or modules having the same or similar functions. The embodiments described below with reference to the accompanying drawings are exemplary, are only intended to illustrate the present disclosure, and are not construed to limit the present disclosure. Rather, embodiments of the present application include all changes, modifications, and equivalents falling within the spirit and scope of the appended claims.

In related arts, the generally displayed navigation information is a distance from the intersection for changing direction to a current position, such that the driver may makes a judgment based on the distance. However, it is difficult for the driver to identify the distance. For example, it is difficult to distinguish between 200 meters and 150 meters. As a result, it is impossible to quickly and accurately find the intersection for changing direction guided by the navigation, and thus entering a wrong way occurs.

Therefore, embodiments of the present disclosure provide a method and a device for displaying navigation information, a locating device, a non-transitory computer readable storage medium, and a computer program product.

FIG. 1 is a flow chart illustrating a method for displaying navigation information provided in embodiment of the present disclosure.

As illustrated in FIG. 1, the method according to embodiments of the present disclosure includes the following.

In block S11, a current position and a position of an intersection for changing direction are acquired.

The current position (denoted by CurPos) may be acquired according to a global positioning system (GPS), and the position of a next intersection for changing direction (denoted by GuidePos) may be acquired according to a route planning. The term "intersection" refers to a next marked position of a navigation route, which may be a positon for changing the direction, or may be a position that is a fork instead of changing direction.

In block S12, road features between the current position and the position of the intersection for changing direction are analyzed to determine a ground object of the intersection for changing direction.

The ground object of the intersection for changing direction refers to a certain feature of the intersection, such as a traffic-light intersection, a regular crossing intersection, being at an end of a road, or the like. Generally, the ground object is easily identified by a user.

In detail, the ground object may be defined by analyzing whether the road features between the current position and the position of the intersection for changing direction satisfy defined ground objects and satisfy which kind of the defined ground objects. Therefore, the ground object of the intersection for changing direction may be determined.

The ground object of the intersection for changing direction may include at least one of the followings illustrated in Table 1.

TABLE 1

| | |
|---|---|
| a traffic-light intersection | there is a traffic light at the intersection for changing direction, and there is no any other traffic-light intersection between the current position and the position of the intersection for changing direction |
| a crossing intersection | the intersection for changing direction is a crossing intersection, and there is no any other crossing intersection between the current position and the position of the intersection for changing direction |
| a second traffic-light intersection | there is the traffic light at the intersection for changing direction, and there is only one traffic-light intersection between the current position and the position to the intersection for changing direction |
| a second crossing intersection | the intersection for changing direction is a crossing intersection, and there is only one crossing intersection between the current position and the position of the intersection for changing direction |
| a second intersection | the intersection for changing direction is a conventional intersection, and there is another conventional intersection having a same turning direction with this intersection between the current position and the position of the intersection for changing direction |
| an end of a road | the intersection for changing direction is at the end of a road |
| being in a tunnel | the intersection for changing direction is inside a tunnel |
| XX meters/a next intersection after a bridge | the intersection for changing direction is at XXXX meters a next intersection after a bridge |
| XX meters a next intersection after a tunnel | the intersection for changing direction is at XXXX meters a next intersection after a tunnel |
| XX meters a next intersection after a traffic-light intersection | the intersection for changing direction is at XXXX meters/a next intersection after a traffic-light intersection |
| XX meters a next intersection after a crossing intersection | the intersection for changing direction is at XXXX meters/a next intersection after a crossing intersection |

In block S13, the ground object of the intersection for changing direction is displayed.

When the ground object of the intersection for changing direction is determined, the ground object may be used as a kind of navigation information, such that the ground object may be displayed to the user together with other navigation information.

Figure 2:
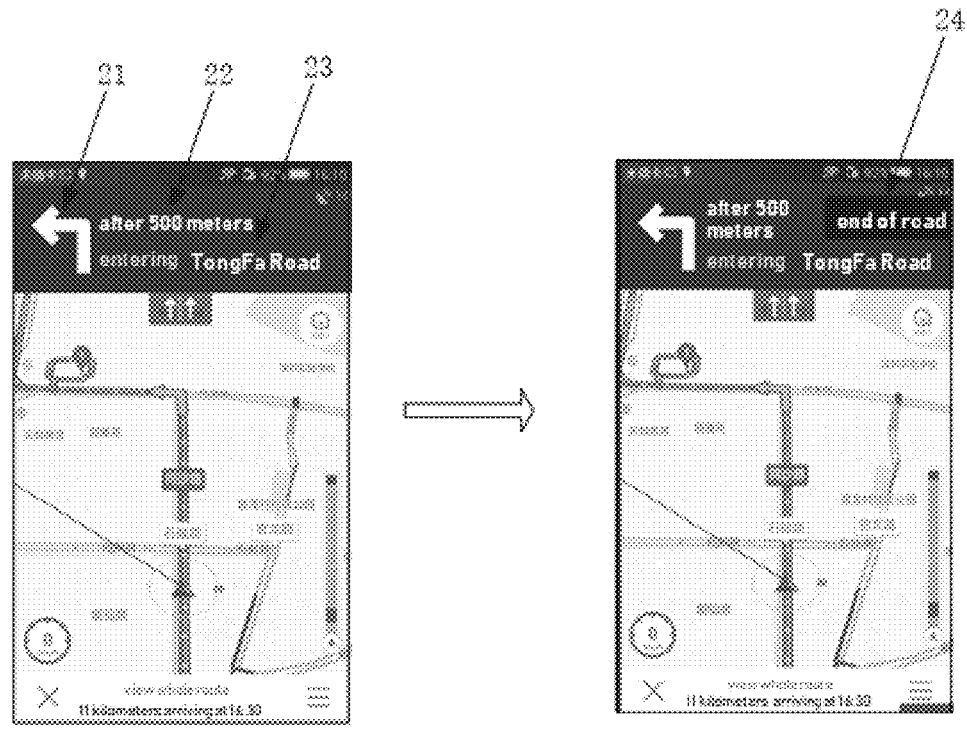
FIG. 2 is a schematic diagram illustrating a comparison between navigation information displayed in embodiments of the present disclosure and navigation information displayed conventionally.

For example, as illustrated in FIG. 2, at a left side, there is a schematic diagram for conventionally displaying the navigation information. The navigation information includes a turning type pattern 21, a distance 22 from the position of the intersection for changing direction to the current position, and other information 23 of the intersection for changing direction. In comparison, in embodiments of the present disclosure, as illustrated at a right side of FIG. 2, the navigation information further includes the ground object 24, in addition to conventionally displayed information.

In embodiments, by determining and displaying the ground object of the intersection for changing direction, it allows the user to quickly and accurately find the intersection for changing direction guided by navigation, since the ground object is easily identified by the user, thereby improving user experience.

Figure 3:
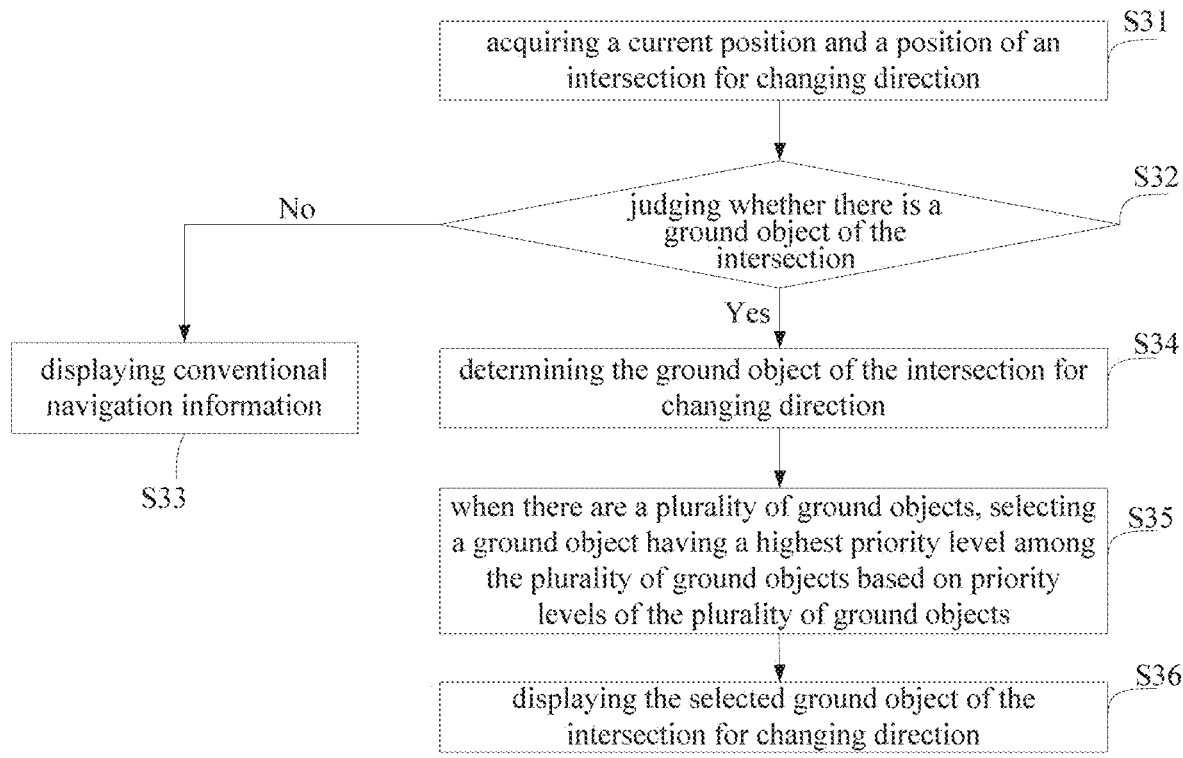
FIG. 3 is a flow chart illustrating a method for displaying navigation information provided in another embodiment of the present disclosure.

FIG. 3 is a flow chart illustrating a method for displaying navigation information according to another embodiment of the present disclosure.

As illustrated in FIG. 3, the method according to embodiments may include the following.

In block S31, a current position and a position of an intersection for changing direction are acquired.

The current position (denoted by Curpos) may be acquired based on a GPS, and the position of the intersection for changing direction (denoted by GuidePos) may be acquired according to a route planning.

In block S32, road features between the current position and the position of the intersection for changing direction are analyzed to determine whether there is a ground object of the intersection for changing direction. When there is the ground object of the intersection for changing direction, a block S34 is executed. Otherwise, a block S33 is executed.

The ground object of the intersection for changing direction refers to a certain feature of the intersection for changing direction, such as a traffic-light intersection, a regular crossing intersection, being at an end of a road, or the like.

In detail, the ground object may be defined by analyzing whether the road features between the current position and the position of the intersection for changing direction satisfy defined ground objects. When there is a road feature satisfying the defined ground objects, it is determined that there is the ground object of the intersection for changing direction. Otherwise, there is no ground object of the intersection for changing direction.

In block S33, conventional navigation information is displayed.

For example, the navigation information illustrated at a left side of FIG. 2 is displayed, including a turning type pattern, a distance from the position of the intersection for changing direction to the current position, a name of the intersection for changing direction, or the like.

In block S34, the ground object of the intersection for changing direction is determined.

By analyzing whether the road features between the current position and the position of the intersection for changing direction satisfy the defined ground objects, a road feature satisfying the defined ground objects is determined as the ground object of the intersection for changing direction when there is the road feature satisfying the defined ground objects.

In block S53, when there are a plurality of ground objects of the intersection for changing direction, a ground object having a highest priority level is selected from the plurality of ground objects according to priority levels of the plurality of ground objects.

The priority level for each ground object may be set in advance. For example, the priority levels of the plurality of ground objects may be defined as: the priority level of "an end of a road"> the priority level of "traffic light"> the priority level of "bridge"> the priority level of "tunnel"> the priority level of "crossing intersection"> the priority level of "second intersection".

Therefore, the ground object having the highest priority level may be selected from the plurality of determined ground objects, according to a relation of the priority levels set in advance.

In block S36, the selected ground object of the intersection for changing direction is displayed.

For example, ground objects of an intersection between the current position and the position of the intersection for changing direction are analyzed. The ground objects of the intersection include: an end of a road and a traffic light. Since the priority level of "the end of the road" is higher than the priority level of "the traffic light", "the end of the road" is selected and displayed as the navigation information.

Further, when the ground object of the intersection for changing direction is displayed, the ground object may be displayed on a navigation panel in text, as illustrated in FIG. 2. Alternatively, the ground object of the intersection for changing direction may be played in voice for the user.

When a location of the user (such as a driver) is changed, the block S31 and its subsequent blocks may be repeated.

In embodiments, by determining and displaying the ground object of the intersection for changing direction, it facilitates the user to quickly and accurately find the intersection for changing direction guided by navigation, since the ground object is easily identified by the user, thereby improving user experience. Furthermore, when there are a plurality of ground objects, the ground object having the highest priority level selected from the plurality of ground objects may be displayed according to the priority levels of the plurality of ground objects, such that a display effect is improved. Further, when there is no ground object, the conventional navigation information is displayed, which may be compatible to related arts.

Figure 4:
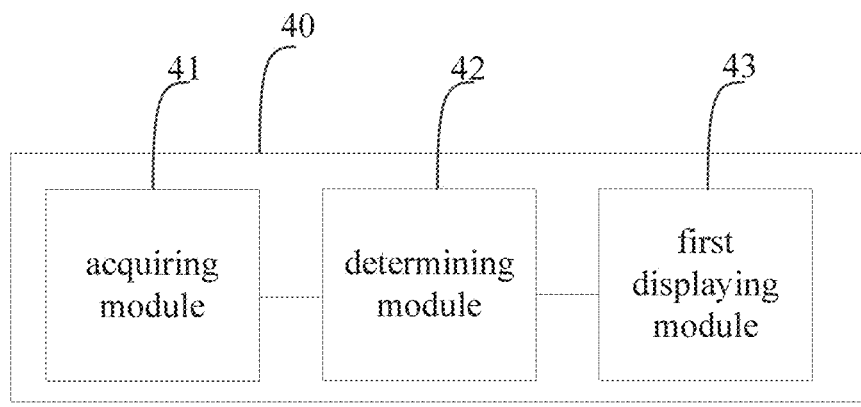
FIG. 4 is a block diagram illustrating a device for displaying navigation information provided in an embodiment of the present disclosure.

FIG. 4 is a block diagram illustrating a device for displaying navigation information provided in an embodiment of the present disclosure.

As illustrated in FIG. 4, the device 40 includes an acquiring module 41, a determining module 42 and a first displaying module 43.

The acquiring module 41 is configured to acquire a current position and a position of an intersection for changing direction.

The determining module 42 is configured to analyze road features between the current position and the position of the intersection for changing direction to determine a ground object of the intersection for changing direction.

The first displaying module 43 is configured to display the ground object of the intersection for changing direction.

Figure 5:
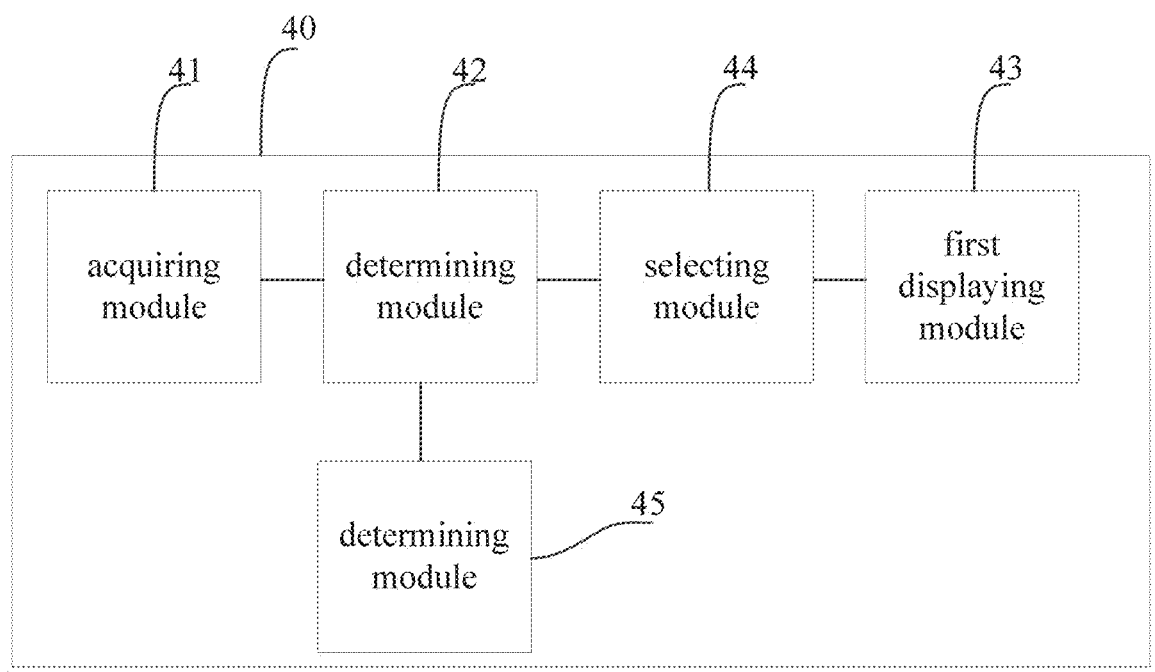
FIG. 5 is a block diagram illustrating a device for displaying navigation information provided in another embodiment of the present disclosure.

In some embodiments, as illustrated in FIG. 5, when there are a plurality of ground objects of the intersection for changing direction, the device 40 further includes a selecting module 44.

The selecting module 44 is configured to select a ground object having a highest priority level from the plurality of ground objects based on priority levels of the plurality of ground objects, to display the selected ground object.

In some embodiments, the ground object includes at least one of: a traffic-light intersection, a crossing intersection, a second traffic-light intersection, a second crossing intersection, a second intersection, an end of a road, being in a tunnel, a preset distance or a next intersection after a bridge, a preset distance or a next intersection after a tunnel, a preset distance or a next intersection after a traffic-light intersection, a preset distance or a next intersection after a crossing intersection.

In some embodiments, the first displaying module 43 is specifically configured to: display the ground object of the intersection for changing direction on a navigation panel in text; and/or play the ground object of the intersection for changing direction in voice.

In some embodiments, as illustrated in FIG. 5, the device 40 further includes a second displaying module 45.

The second displaying module 45 is configured to display conventional navigation information when there is no ground object of the intersection for changing direction.

It may be understood that, by determining and displaying the ground object of the intersection for changing direction, it facilitates a user to quickly and accurately find the intersection for changing direction guided by navigation since the ground object is easily identified by the user, thereby improving user experience.

Embodiments of the present disclosure further provide a device, including: a processor, and a memory, configured to store instructions executable by the processor. The processor is configured to acquire a current position and a position of an intersection for changing direction; analyze road features between the current position and the position of the intersection for changing direction, to determine a ground object of the intersection for changing direction; and display the ground object of the intersection for changing direction.

Embodiments of the present disclosure further provide a non-transitory computer readable storage medium. When instructions in the storage medium are executed by a processor of a terminal, the terminal is configured to acquire a current position and a position of an intersection for changing direction; analyze road features between the current position and the position of the intersection for changing direction, to determine a ground object of the intersection for changing direction; and display the ground object of the intersection for changing direction.

Embodiments of the present disclosure further provide a computer program product. When instructions in the computer program product are executed, a method for displaying navigation information is executed. The method includes acquiring a current position and a position of an intersection for changing direction; analyzing road features between the current position and the position of the intersection for changing direction, to determine a ground object of the intersection for changing direction; and displaying the ground object of the intersection for changing direction.

It may be understood that, same or similar parts in above embodiments may be referred to each other. Those that are not described in detail in some embodiments may refer to same or similar contents in other embodiments.

It is to be illustrated that, in descriptions of the present disclosure, terms such as "first" and "second" are used for purposes of description and are not intended to indicate or imply relative importance or significance. In addition, in the description of the present disclosure, the term "a plurality of" means at least two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution may be different from that which is depicted or discussed, including executing functions in a substantially simultaneous manner or in an opposite order according to the related functions, which should be understood by those skilled in the art of the embodiments of the present disclosure.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples.

What is claimed is:

1. A method for displaying navigation information, comprising:
    acquiring a current position and a position of an intersection for changing direction;
    analyzing road features between the current position and the position of the intersection for changing direction, to determine a ground object of the intersection for changing direction; and
    displaying the ground object of the intersection for changing direction;
    wherein the ground object comprises at least one of: a traffic-light intersection, a crossing intersection, a second traffic-light intersection, a second crossing intersection, a second intersection, an end of a road, being in a tunnel, a preset distance or a next intersection after a bridge, a preset distance or a next intersection after a tunnel, a preset distance or a next intersection after a traffic-light intersection, a preset distance or a next intersection after a crossing intersection; and
    a priority level of the end of the road is higher than a priority level of the traffic-light intersection, the priority level of the traffic-light intersection is higher than a priority level of the preset distance or the next intersection after the bridge, the priority level of the preset distance or the next intersection after the bridge is higher than a priority level of the preset distance or the next intersection after the tunnel, the priority level of the preset distance or the next intersection after the tunnel is higher than a priority level of the crossing intersection, and the priority level of the crossing intersection is higher than a priority level of the second intersection.

2. The method according to claim 1, wherein analyzing the road features between the current position and the position of the intersection for changing direction, to determine the ground object of the intersection for changing direction further comprises:
    determining a plurality of candidate ground objects according to the road features;
    selecting a ground object having a highest priority level among the plurality of candidate ground objects based on priority levels of the plurality of ground objects; and
    displaying the selected ground object.

3. The method according to claim 1, wherein displaying the ground object of the intersection for changing direction comprises:
    displaying the ground object of the intersection for changing direction on a navigation panel in text; and/or
    playing the ground object of the intersection for changing direction in voice.

4. The method according to claim 1, further comprising:
    displaying conventional navigation information when there is no ground object of the intersection for changing direction.

5. The method according to claim 1, wherein after the current position is changed, returning to an act of acquiring the current position and the position of the intersection for changing direction.

6. A locating device, comprising:
    a processor; and
    a memory, configured to store instructions executable by the processor;
    wherein the processor is configured to
    acquire a current position and a position of an intersection for changing direction;
    analyze road features between the current position and the position of the intersection for changing direction, to determine a ground object of the intersection for changing direction; and
    display the ground object of the intersection for changing direction;
    wherein the ground object comprises at least one of: a traffic-light intersection, a crossing intersection, a second traffic-light intersection, a second crossing intersection, a second intersection, an end of a road, being in a tunnel, a preset distance or a next intersection after a bridge, a preset distance or a next intersection after a tunnel, a preset distance or a next intersection after a traffic-light intersection, a preset distance or a next intersection after a crossing intersection; and
    a priority level of the end of the road is higher than a priority level of the traffic-light intersection, the priority level of the traffic-light intersection is higher than a priority level of the preset distance or the next intersection after the bridge, the priority level of the preset distance or the next intersection after the bridge is higher than a priority level of the preset distance or the next intersection after the tunnel, the priority level of the preset distance or the next intersection after the tunnel is higher than a priority level of the crossing intersection, and the priority level of the crossing intersection is higher than a priority level of the second intersection.

7. The locating device according to claim 6, wherein the processor is configured to analyze the road features between the current position and the position of the intersection for changing direction, to determine the ground object of the intersection for changing direction by acts of:
   determining a plurality of candidate ground objects according to the road features;
   selecting a ground object having a highest priority level among the plurality of candidate ground objects based on priority levels of the plurality of ground objects; and
   displaying the selected ground object.

8. The locating device according to claim 6, wherein the processor is configured to display the ground object of the intersection for changing direction by acts of:
   displaying the ground object of the intersection for changing direction on a navigation panel in text; and/or
   playing the ground object of the intersection for changing direction in voice.

9. The locating device according to claim 6, wherein the processor is configured to:
   display conventional navigation information when there is no ground object of the intersection for changing direction.

10. The locating device according to claim 6, wherein the processor is further configured to return to an act of acquiring the current position and the position of the intersection for changing direction after the current position is changed.

11. A non-transitory computer readable storage medium, wherein when instructions in the storage medium are executed by a processor of a terminal, the terminal is configured to:
    acquire a current position and a position of an intersection for changing direction;
    analyze road features between the current position and the position of the intersection for changing direction, to determine a ground object of the intersection for changing direction; and
    display the ground object of the intersection for changing direction;
    wherein the ground object comprises at least one of: a traffic-light intersection, a crossing intersection, a second traffic-light intersection, a second crossing intersection, a second intersection, an end of a road, being in a tunnel, a preset distance or a next intersection after a bridge, a preset distance or a next intersection after a tunnel, a preset distance or a next intersection after a traffic-light intersection, a preset distance or a next intersection after a crossing intersection; and
    a priority level of the end of the road is higher than a priority level of the traffic-light intersection, the priority level of the traffic-light intersection is higher than a priority level of the preset distance or the next intersection after the bridge, the priority level of the preset distance or the next intersection after the bridge is higher than a priority level of the preset distance or the next intersection after the tunnel, the priority level of the preset distance or the next intersection after the tunnel is higher than a priority level of the crossing intersection, and the priority level of the crossing intersection is higher than a priority level of the second intersection.

12. The non-transitory computer readable storage medium according to claim 11, wherein the terminal is configured to analyze the road features between the current position and the position of the intersection for changing direction, to determine the ground object of the intersection for changing direction by acts of:
    determining a plurality of candidate ground objects according to the road features;
    selecting a ground object having a highest priority level among the plurality of candidate ground objects based on priority levels of the plurality of ground objects; and
    displaying the selected ground object.

13. The non-transitory computer readable storage medium according to claim 11, wherein the terminal is configured to display the ground object of the intersection for changing direction by acts of:
    displaying the ground object of the intersection for changing direction on a navigation panel in text; and/or
    playing the ground object of the intersection for changing direction in voice.

14. The non-transitory computer readable storage medium according to claim 11, wherein the terminal is configured to:
    display conventional navigation information when there is no ground object of the intersection for changing direction.

* * * * *